United States Patent [19]
Williams

[11] Patent Number: 5,394,916
[45] Date of Patent: Mar. 7, 1995

[54] MULTIPLE TREAD GEOMETRIES FOR REDUCED TIRE TREAD NOISE

[75] Inventor: Thomas A. Williams, North Canton, Ohio

[73] Assignee: General Tire, Inc., Akron, Ohio

[21] Appl. No.: 38,524

[22] Filed: Mar. 29, 1993

[51] Int. Cl.$^6$ .............................................. B60C 11/06
[52] U.S. Cl. ................................................. 152/209 R
[58] Field of Search .......... 152/209 R, 209 A, 209 D; D12/146, 147

[56] References Cited

U.S. PATENT DOCUMENTS

| | | | |
|---|---|---|---|
| D. 331,735 | 12/1992 | Maxwell | D12/147 |
| D. 333,643 | 3/1993 | Maxwell | D12/147 |
| D. 336,738 | 6/1993 | Mentag | D12/146 |
| 1,946,367 | 2/1934 | Straight | 152/209 R |
| 1,956,011 | 4/1934 | Evans | 152/209 R |
| 2,808,867 | 10/1957 | Buddenhagen et al. | 152/209 R |
| 2,878,852 | 3/1959 | Lippmann et al. | |
| 3,094,157 | 6/1963 | Klohn | 152/209 R |
| 3,861,436 | 1/1975 | Poque | 152/209 R |
| 3,926,238 | 12/1975 | Vorih | |
| 4,777,993 | 10/1988 | Yamashita et al. | 152/209 R |
| 5,178,698 | 1/1993 | Shibata | 152/209 R |

FOREIGN PATENT DOCUMENTS

| | | |
|---|---|---|
| 0686949 | 4/1930 | France . |
| 4107051 | 9/1992 | Germany . |
| 3136908 | 6/1991 | Japan . |
| 3136909 | 6/1991 | Japan . |
| 3239606 | 10/1991 | Japan . |
| 4185509 | 7/1992 | Japan . |

OTHER PUBLICATIONS

U.S. patent application, Ser. No. 07/792,006, filed Nov. 14, 1991; Applicant: Thomas A. Williams.

Primary Examiner—Michael W. Ball
Assistant Examiner—Steven D. Maki
Attorney, Agent, or Firm—Calfee, Halter & Griswold

[57] ABSTRACT

A tire with reduced tread noise includes a tread having a plurality of base pitches arranged about the circumference of the tire in at least one pitch sequence. Each base pitch in the pitch sequence has a tread geometry defined by a plurality of load-supporting tread blocks separated or interrupted by grooves and/or sipes. The base pitches in the pitch sequence have different tread geometries to reduce the noise of the tire on the road surface. The grooves and/or sipes in each base pitch have common end points along the leading and trailing edges of the base pitches such that the grooves and/or sipes are continuous across the boundary between adjacent base pitches in the pitch sequence. Likewise, the grooves and/or sipes in each base pitch in one rib or row in the tire can have common end points along the edge between a base pitch in an adjacent rib or row, such that the grooves and/or sipes are continuous in the lateral direction as well. The base pitches formed in this manner can be arranged in a particular pitch sequence regardless of: (i) the individual tread geometry of each base pitch, or (ii) the particular sequence of base pitches. Moreover, the length of the base pitches in the circumferential direction can also be varied by known manners (e.g., random, sinusoidal) to further reduce the noise of the tire on a road surface.

4 Claims, 3 Drawing Sheets

MULTIPLE TREAD GEOMETRIES FOR REDUCED TIRE TREAD NOISE

The present invention relates generally to tire treads, and more particularly to a technique for reducing tire tread noise by using different tread geometries for the base pitches in the tire tread.

BACKGROUND OF THE INVENTION

The tread of a modern tire extends around the outer circumference of the tire and is designed to contact the road surface. The tread is typically divided into a plurality of raised, load-supporting tread blocks separated by intersecting circumferential and transverse grooves and/or sipes. The tread blocks determine the control, acceleration and braking characteristics of the tire, while the grooves and/or sipes are necessary to provide flexibility and water removal.

The tread blocks are typically arranged in "base pitches" around the tire, wherein each base pitch includes a predetermined geometry of whole and/or partial tread blocks separated by grooves and/or sipes. Each tread block in the base pitch can be separated from the other tread blocks by circumferential grooves, transverse grooves, and/or grooves which extend in other selected directions. Likewise, the tread blocks can be separated or interrupted by circumferential sipes, transverse sipes, and/or sipes which extend in other selected directions, as is known to those skilled in the art. In other words, each base pitch has a particular tread geometry which is chosen by the designer at least in part according to the factors outlined above.

Additionally, each base pitch may vary in width across the tire. For example, each base pitch may extend transversely from one shoulder to the other shoulder of the tire. Alternatively, there may be several rows or ribs of base pitches, each of which extend transversely over only a single circumferential section of the tire, for example over a single rib or combination of ribs. In any case, the base pitches are repeated around the circumference of the tire to form the complete tire tread.

The constant contact of the tire tread with the road surface during use can often create unwanted noise. In particular, as the tire contacts the road surface, the individual tread blocks cause air disturbances upon impact with the road, creating a spectrum of audio frequencies broadly referred to as "tire noise". Tire noise is generated at least in part by: (1) the impact of the tread block on the road surface; (2) the vibration of the tire carcass; and (3) the "air pumping" which occurs as the tread blocks become compressed and expand into the grooves separating adjacent blocks.

Various tread designs have been developed which attempt to reduce the noise of the tread on the road surface. Such noise treatment techniques attempt to distribute the noise frequency produced by the tire tread over a wide frequency band to approach what is termed "white noise". For example, one known technique for reducing tread noise is to use base pitches having different pitch lengths, wherein the "pitch length" is a measure of the length from the leading edge of one base pitch to the leading edge of the next adjacent base pitch in the circumferential direction of the tire. A plurality of base pitches having different pitch lengths is conventionally referred to as a "pitch sequence".

Lippman et al U.S. Pat. No. 2,878,852, discloses a tire tread having male and female mold halves, wherein each mold half has a separate pitch sequence extending around the circumference of the tire. Lippman discloses a pitch sequence which is represented by the series of relative circumferential distances: 9 10 11 12 10 11 12 13 12 11 10 9 11 12 13 10 10 13 12 11 9 10 11 12 13 12 11 10 12 11 10 9. These circumferential distances represent the relative circumferential length of successive tread units expressed in any desired measuring unit. In Lippman the tread units are selected to be mirror images of themselves or of other groups in each respective mold half.

Another technique for reducing tire tread noise is shown in Williams, Ser. No. 07/792,006, filed Nov. 14, 1991, entitled "Tire Pitch Sequencing Technique", which is owned by the assignee of the present invention. Williams specifies certain pitch length criteria for arranging the base pitches relative to each other in the pitch sequence to reduce the noise of the tire.

Other techniques use random or sinusoidal sequencing of the pitches in an attempt to modulate the objectionable noise producing frequencies and spread the tire noise over a broad frequency spectrum (see e.g., Vorih, U.S. Pat. No. 3,926,238).

It is noted that the Lippman, Williams and Vorih disclose varying the pitch length of each base pitch according to certain criteria. However, in all other respects, the tread geometry of each base pitch is identical to the tread geometry in an adjacent base pitch in the pitch sequence. In fact, typical tire tread patterns have a uniform tread geometry used for each base pitch which is repeated around the entire circumference of the tire using techniques such as described above. All of the base pitches of the tread pattern appear similar, except for their variations in circumferential pitch length.

Accordingly, the above references disclose certain techniques which are designed to reduce noise produced by the tire tread when contacting the road surface. However, there is a constant demand in the industry for new and improved techniques for providing a tire with reduced tire tread noise, and in particular, techniques which can be used in addition to, or alternatively to, the techniques described above for providing a tire which has a reduction in tire tread noise on the road surface.

SUMMARY OF THE INVENTION

The present invention provides a new and useful technique for designing tire treads, and in particular provides a new and useful technique for providing a tire tread which reduces the tread noise and distributes the noise of the tire tread over a broad frequency range.

The tire tread has base pitches arranged around the circumference of the tire in at least one pitch sequence. Each base pitch includes a plurality of load-supporting tread blocks separated by circumferential grooves, transverse grooves and/or grooves which extend in other predetermined directions. Further, each base pitch can have sipes which extend in circumferential, transverse or at other selected directions in the base pitch to separate or interrupt the tread blocks.

According to the present invention, the tread geometry of the individual base pitches is varied around the circumference of the tire. The different tread geometries are formed by the grooves and/or sipes extending in different paths through the tread blocks in each base pitch. The number and location of the base pitches having different tread geometries can be determined based on appropriate criteria for wear and traction. However, all the base pitches have common edge points along their leading and trailing edges, such that the grooves and/or sipes of the tread which cross adjacent base pitches in the circumferential direction of the tire do not abruptly end, but rather are continuous across adjacent base pitches.

Further, the grooves and/or sipes of the base pitches can have common end points along the boundary between base pitches in adjacent rows or ribs, such that the grooves and/or sipes of the tread which cross adjacent base pitches in the lateral direction of the tire do not abruptly end, but rather are also continuous across the base pitches in the adjacent rib or row. Each such groove or sipe in each kind of base pitch extends circumferentially relative to the tire axis and has a maximum variation from its intersection with the lateral boundary of the base pitch that is different from the maximum lateral variations of the grooves or sipes of the other kinds of base pitches.

Accordingly, the base pitches can be arranged in any sequence around the circumference of the tire, regardless of the different tread geometries of the base pitches, and regardless of the particular arrangement of base pitches. The different tread geometries of the base pitches distribute the noise of the tire over a broad frequency range and thereby reduce the noise of the tread on a road surface. Further, the final design of the tire tread is determined primarily by the different base pitch tread geometries which provide the greatest reduction in tire tread noise, rather than only by the variation in length of the base pitches in the circumferential direction of the tire.

Further, this technique can be used in addition to, or alternatively to, other noise reduction techniques to reduce the noise of the tire on the road surface, such as by varying the length of the base pitch in the circumferential direction of the tire using sinusoidal or random sequences, or by other known techniques or methods.

Accordingly, it is a basic object of the present invention to provide a tire tread that has reduced tread noise on a road surface.

It is another object of the present invention to provide a tire tread wherein the noise treatment for the tire tread is embodied, at least in part, in the different tread geometries of the base pitches.

Further objects of the present invention will become apparent from the following detailed description and the accompanying drawings.

DETAILED DESCRIPTION OF THE PREFERRED EMBODIMENT

Figure 1:
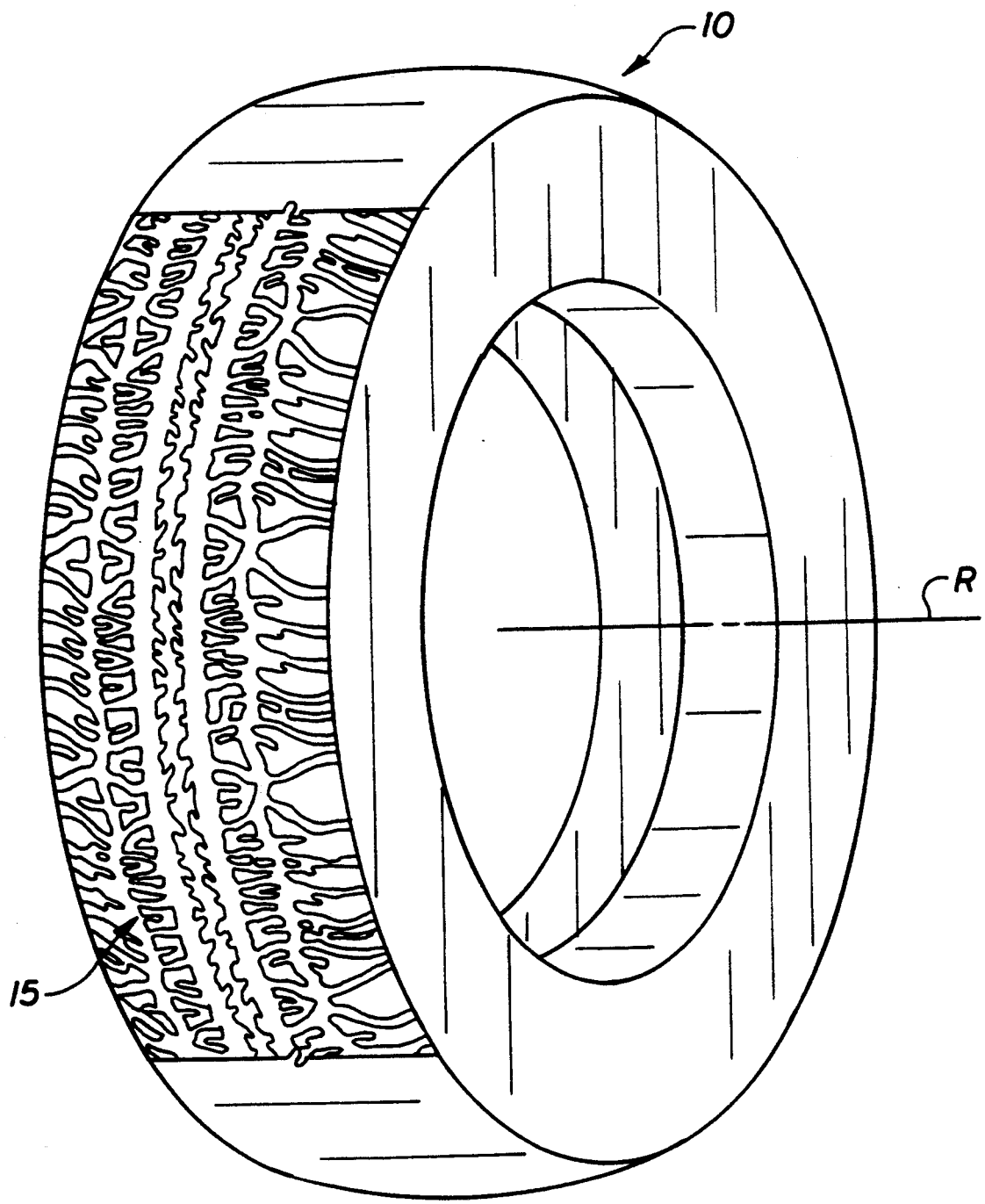
FIG. 1 is a perspective view of a tire having a tread made in accordance with the present invention.

Referring to the drawings, and initially to FIG. 1, a tire, indicated generally at 10, includes a tire tread, indicated generally at 15, which extends around the circumference of the tire. The tire is designed to rotate around an axis "R" during contact with the road surface. According to the preferred form of the invention, the tire is preferably a radial tire. However, the present invention is not limited to any particular tire type, size or style. Rather, the invention may be applied to any type of tire having a tread. The techniques for manufacturing and forming such tires are known to those skilled in the tire art and will not be discussed herein.

Figure 2:
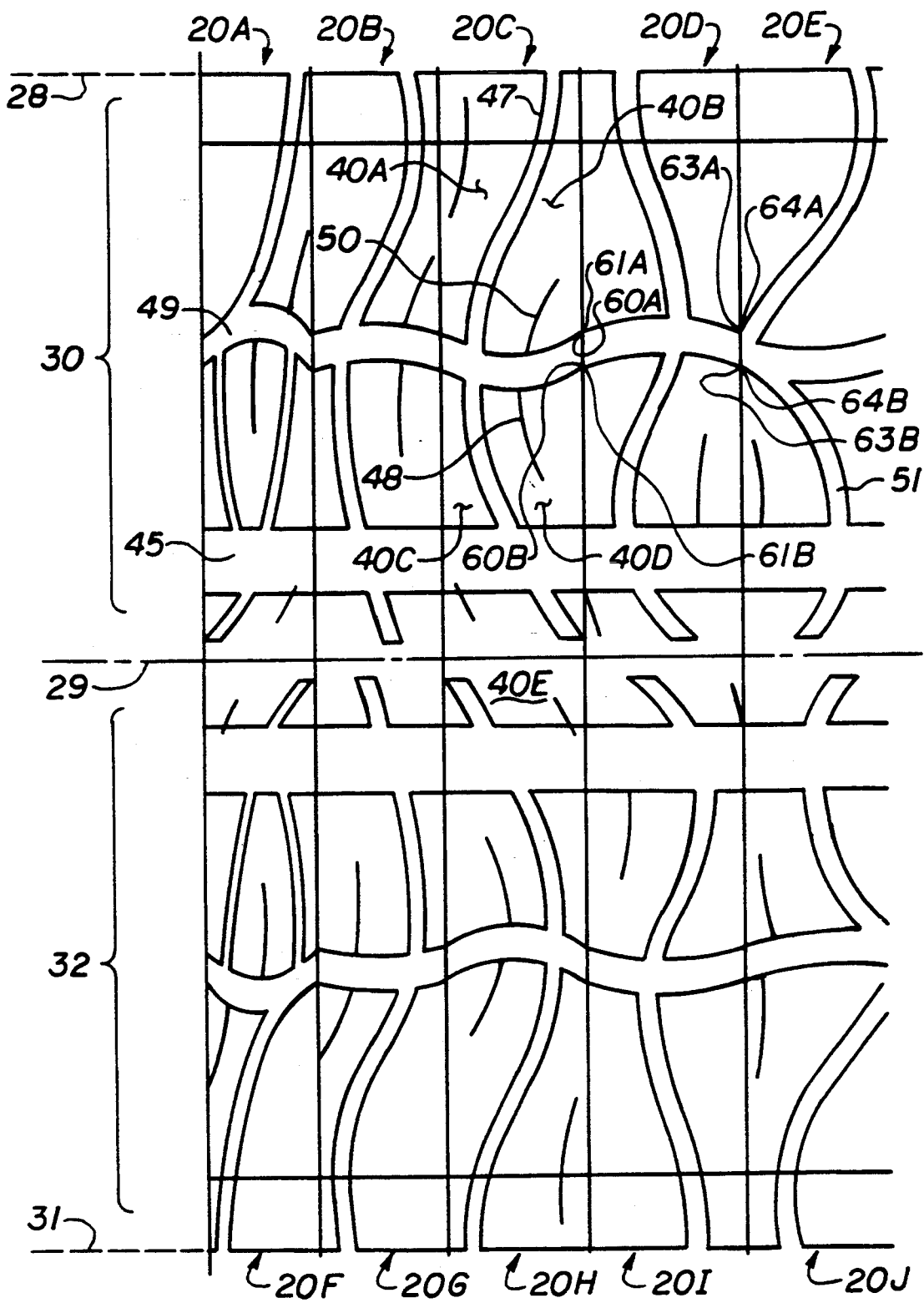
FIG. 2 is a schematic illustration of one tire tread design made in accordance with the principles of the present invention.

As shown in FIG. 2, the tire tread 15 includes a plurality of base pitches, for example base pitches 20A–20J. In this exemplary tread pattern, the tire tread has 88 base pitches. The base pitches have five different pitch lengths (i.e., 1, 2, 3, 4, 5) arranged in the following sequence: 23442333341131322532331331222 32211244553234311435513232321442513534444554541- 5151511 222115. For this pitch sequence, the following ratios of pitch lengths can be used and labeled as follows: 0.7488- 0.8410- 0.9348- 1.0280- 1.1220- for the above blocks numbered 1, 2, 3, 4, 5, respectively.

Each base pitch 20A–20E in the tread preferably extends transversely from the inside shoulder 28 to the center line 29 of the tire tread to form a bottom half 30, while base pitches 20F–20J extend from centerline 29 to the opposite shoulder 31 to form a top half 32. However, as indicated previously, each base pitch could also extend transversely across only a portion of the tire, for example across one circumferential section (or rib) of the tire, or across the entire width (i.e., from shoulder 48 to the opposite shoulder 31) of the tire.

Each base pitch 20A–20E includes an arrangement of whole and/or partial load-supporting tread blocks. For example, base pitch 20C at least partially includes tread blocks 40A–40E spread across base pitch. The tread blocks are separated or interrupted by grooves and/or sipes to form the tread pattern. For example, tread blocks 40C and 40E are separated by circumferential groove 45, while tread blocks 40A and 40B are separated by transverse groove 47. Further, sipe 48 extends inwardly toward the centerline of the tire from circumferential groove 49 and at least partially bisects tread block 40D. Additionally, sipe 50 extends outwardly away from the centerline of the tire from circumferential groove 49 and at least partially bisects tread block 40B.

The circumferential and transverse grooves and/or sipes can be relatively straight (e.g., such as circumferential groove 45), or can be curved or bent (e.g., such as circumferential groove 49), as is generally known by those skilled in the art. Moreover, the grooves and/or sipes in each base pitch can extend in other than circumferential and transverse directions across the tread block (e.g., such as groove 51 in base pitch 20E which extends in an arc), and can extend between adjacent grooves, can originate and terminate at the same groove, or can cross the boundary of adjacent base pitches (such as circumferential groove 49). In other words, the tread geometry of each base pitch can comprise any predetermined geometry of tread blocks, grooves and sipes, and can be based on any prescribed criteria for producing a tread pattern, such as block stiffness, noise, handling, wear, and/or stone removal, as is known to those skilled in the art.

Moreover, according to the present invention, certain of the base pitches around the circumference of the tire have different tread geometries. In particular, the arrangement of whole and/or partial tread blocks, and the location of the grooves and/or sipes in each base pitch, varies around the tire according to certain criteria, as will be described more fully herein. As used herein, the term "tread geometry" relates to the particular arrangement of tread blocks, grooves and/or sipes within each base pitch; while the term "tread pattern" relates to the tread design of the entire tire tread. According to the present invention, the tread pattern of the tire has a number of different tread geometries which it has been determined reduce the noise of the tire on the road surface.

A tire constructed according to this technique has reduced tread noise because the noise of the tire is spread across a broad frequency range. It is believed that by having base pitches with different tread geometries, cyclical vibrations are prevented from occurring, as the harmonics caused by the impact of the tire tread on the road surface, the vibration of the carcass, and air pumping, are spread across a broad frequency range.

However, for traction and wear reasons, it is important that the grooves and/or sipes in the tread be continuous around the tire, particularly in the circumferential direction, and not abruptly terminate across adjacent base pitches because of any different tread geometries between the base pitches. Therefore, according to the principles of the present invention, to the extent that any groove and/or sipe extends across adjacent base pitches, such groove(s) and/or sipe(s) has common edge points along the leading and trailing edges of each base pitch, regardless of the geometry of the remainder of the base pitch. Accordingly, the grooves and/or sipes in each base pitch which extend to an edge(s) of the base pitch are matched to a groove and/or sipe, respectively, in an adjacent base pitch. The base pitches can thereby be arranged in any particular sequence relative to each other, regardless of the different geometries of the base pitches and regardless of the particular pitch sequence employed, and still maintain continuity of the grooves and/or sipes across adjacent base pitches.

For example, base pitches 20A-20D in FIG. 2 all have different tread geometries. Circumferential groove 49 in the bottom half 30 of the tire tread extends across base pitches 20A-20E. At the boundary between the base pitches, the groove 49 has common end points across each base pitch. For example, groove 49 has end points 60A, 60B on the leading edge of base pitch 20C which match end points 61A, 61B on the trailing edge of adjacent base pitch 20D. Further, groove 49 in base pitch 20*d* has end points 63A, 63B on the leading edge of base pitch 20D which match end points 64A, 64B on the trailing edge of adjacent base pitch 20E. The matching of the end points continues from base pitch to base pitch around the tire tread.

As should be apparent, the end points for groove 49 are located at the same location along both edges of each base pitch. For example, if an end point of groove 49 along the leading edge of a base pitch is one (1) inch from the sidewall, then a corresponding end point of the groove 49 along the trailing edge of the base pitch is also one (1) inch from the sidewall. Using this technique, the base pitches can be arranged relative to each other in any desired sequence. For example, base pitch 20C could also be located adjacent base pitch 20E, in either the leading or trailing direction, with the groove 49 extending continuously across the boundary between these base pitches.

It should also be apparent that although groove 49 is illustrated as extending across the entire length of each base pitch, it is possible that the groove could also be interrupted across the base pitch. In particular, the groove could extend from one edge of the base pitch and terminate along the shoulder or centerline of the tire, or terminate at another groove. Meanwhile, another groove could extend from the opposite edge (at the same location) and also terminate at the centerline or shoulder, or at another groove in the tire. Various other alternatives are also contemplated, as long as the end points of the grooves along the leading and trailing edges of the base pitches are at the same location such that when the base pitches are located in adjacent relation to each other (regardless of which sequence is chosen), the grooves are continuous across the boundary between the base pitches.

This technique may also be applied to sipes which extend across adjacent base pitches. In other words, to the extent that any sipes cross adjacent base pitches, the sipes are formed such that they terminate at the same location along the leading and trailing edges of the base pitches. Thus, regardless of the particular arrangement of base pitches in the pitch sequence, or the tread pattern of any particular base pitch, the grooves and/or sipes are continuous across the base pitches.

Figure 3:
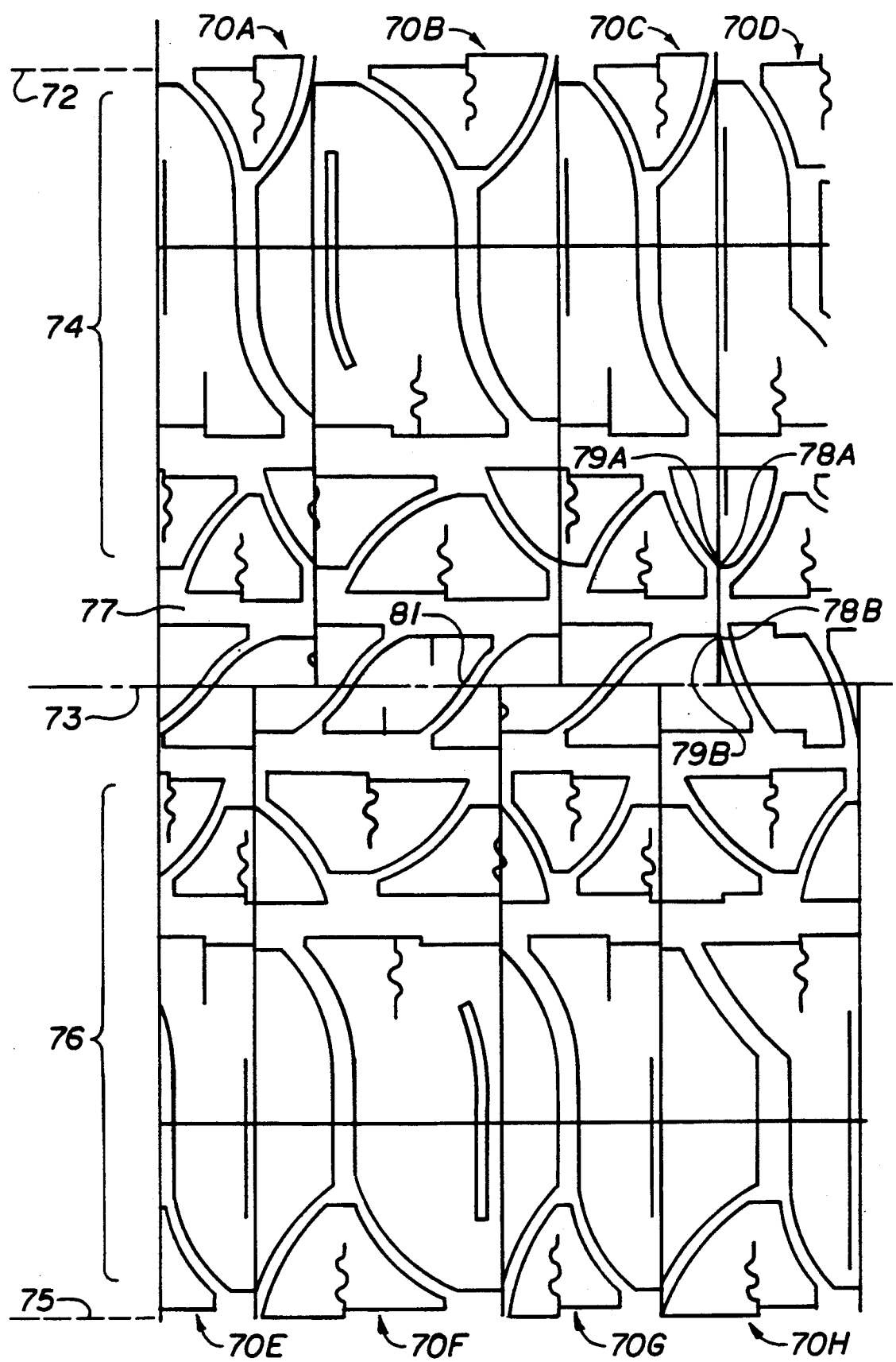
FIG. 3 is a schematic illustration of another tire tread design made in accordance with the principles of the present invention.

Another tread pattern formed according to the principles of the present invention is shown in FIG. 3. In this tread pattern, the tire has 65 base pitches. The base pitches have three different pitch lengths (i.e., 1, 2, 3) arranged in the following sequence: 3112333321113122113332123311123121112311322333*2-3113213* 12221333123. For this pitch sequence, the following ratios of the pitch lengths can be used and labeled as follows: 0.9988- 1.2958- 1.6198 for the above labeled blocks labeled 1, 2, 3, respectively. Base pitches 70A–70D are illustrated as extending from shoulder 72 to the centerline 73 of the tire. Additional base pitches 70E–70H extend from the centerline 73 to the opposite shoulder 75 in the upper half 76. Again, it will be noted that the base pitches in the bottom half 74 have grooves and/or sipes at the same location along the leading and trailing edges of each base pitch, such that the base pitches can be arranged in any manner. For example, base pitch 70C has a different tread geometry than base pitch 70D. Circumferential groove 77 has end points 78A, 78B on the trailing edge of base pitch 70D at the same location as end points 79A, 79B on the leading edge of base pitch 70C. Thus, the base pitches can be arranged in any sequence and have continuity across the leading and trailing edges of the base pitches.

According to a further aspect of the present invention, the grooves and/or sipes that extend across the edges between base pitches in adjacent circumferential rows or ribs also have common end points such that there is continuity laterally across the tire tread as well. For example, as shown in FIG. 3, groove 81 extends across the centerline 73 between base pitch 70B in the bottom half 74 and base pitch 70F in the upper half 76 of the tire. In this case, each base pitch in one row or rib preferably has the same length in the circumferential direction as a corresponding base pitch in the adjacent row or rib. In other words, the pitch sequences in the adjacent rows or ribs are the same. The base pitches may also be arranged such that the leading and trailing edges of the base pitches in one circumferential row or rib match the leading and trailing edges of the base pitches in the adjacent row or rib. In any case, the grooves and/or sipes are continuous laterally across the centerline around the entire tire tread.

Continuity can also thus be maintained in the lateral direction of the tire by forming the grooves and/or sipes between ribs or rows of base pitches with common end points in the same manner as continuity is achieved in the circumferential direction described previously. Nevertheless, some tire tread designs have relatively wide circumferential grooves separating adjacent rows or ribs of base pitches (see, e.g., circumferential groove 45 in FIG. 2), and thus this technique might not be necessary for this type of tire as the benefits in wear and traction are not as significant.

In any case, one particularly advantageous aspect of the present invention is that the principles of the present invention can be easily applied to known techniques for reducing tire tread noise.

For example, the techniques such as discussed in the co-pending application Ser. No. 07/792,006, filed Nov. 4, 1991, of Williams, entitled "Tire Pitch Sequencing Technique for Reduced Tire Tread Noise," could be used in addition to the present invention. In this co-pending application, the base pitches in the pitch sequence(s) are arranged relative to each other according to certain pitch length criteria to reduce the noise of the tire on the road surface. It is within the scope of the present invention to have a different tread geometry (such as described above) for each base pitch with a different pitch length in the pitch sequence(s). Because the edges between base pitches have grooves and/or sipes with common edge points according to the present invention, the base pitches can be arranged in any selected arrangement while maintaining continuity across the boundary between base pitches.

As discussed in Williams, a particularly useful pitch sequence for a tire tread having three pitch lengths is represented by the following sequence of relative pitch lengths: 33223311311123113112121213332313323311121222331312133212121133123322123321- 1223311 1233113. For this pitch sequence, the following ratios of pitch lengths can be used and labeled as follows: 1.00-1.25-1.50 for the above blocks numbered 1, 2, 3, respectively. Again, even though the base pitches may have different tread geometries based upon the pitch lengths of the base pitches, all the base pitches have common edge points, and thus can be arranged in any manner and still maintain continuity across the boundary of the base pitches. Of course, the pitch sequence described above is only exemplary in nature, and this invention is not intended to be limited to any particular pitch sequence.

Further, other techniques could be used to reduce the tire tread noise. For example, each base pitch around the circumference of the tire can have a different tread geometry of tread blocks and grooves and/or sipes. However, for manufacturing purposes, it is preferred that the tread pattern be limited to between three and seven different tread geometries.

As will be appreciated by those skilled in the art upon reading and understanding the principles of the present invention, by having different tread geometries about the circumference of the tire, the frequency produced by the base pitches will be spread across a broad range. Tests have been run with tire treads which had base pitches formed and arranged in pitch sequences according to the principles of the present invention. The base pitch geometry in the tire treads varied according to pitch length variation (i.e., each base pitch with a particular pitch length had its own base pitch geometry). Upon comparing these tires with tires wherein the base pitches varied in length, but otherwise had the same geometry, it was found that the harmonics produced by the tires formed according to the present invention were flatter and broader than in the control tires. In other words, there were fewer peaks and valleys in the harmonic spectrum in the tires formed according to the present invention. Further, although overall tire tread noise was found to be about the same for all tires tested at speeds less than 30 miles per hour, the noise was reduced at speeds greater than 30 miles per hour.

Accordingly, the present invention provides a simple, yet useful technique for reducing tire noise which can be used on a wide variety of commercially available tires, and as an alternative or in addition to the particular pitch sequence employed.

However, with the present disclosure in mind, it is believed that obvious alternatives will become apparent to those of ordinary skill in the art. The present invention includes such obvious alternatives and is only limited by the scope of the following claims.

What is claimed is:

1. A tire that exhibits reduced tire noise when rolling on pavement comprising:

a tread having two circumferential shoulders and a plurality of grooves and/or sipes between said shoulders arranged in a pattern that is divided into at least three different kinds of base pitches, said base pitches being separated from one another by lateral boundaries extending parallel to the axis of rotation of the tire and arranged in at least one row extending around the circumference of the tire, the grooves and/or sipes within each of said base pitches including groove or sipe intersections with the lateral boundaries of the base pitches that are located at substantially the same distances from said circumferential shoulders, the three different kinds of base pitches being distinguished from one another by a circumferentially extending groove or sipe in each base pitch that has a maximum lateral variation from its intersection with the lateral boundary of the base pitch that is different from the maximum lateral variations of the grooves or sipes of the other base pitches, and the groove or sipe intersections with the lateral boundaries of all of said base pitches being at locations that are substantially the same distances from said circumferential shoulders, whereby said base pitches are arrangeable in any pitch sequence and, regardless of the order of the base pitches in the sequence, the groove or sipe intersections with the lateral boundaries of each base pitch form grooves or sipes that extend across the lateral boundaries, with a circumferentially extending groove or sipe in each different kind of base pitch having a distinctive geometrical shape that alters the distribution of noise frequencies produced when the tire rolls on the pavement.

2. The tire of claim 1, wherein the plurality of grooves and/or sipes of said tread are arranged in a pattern that is divided into at least two rows of base pitches extending around the circumference of the tire, the base pitches of one row being separated from the base pitches of the other row by a circumferential boundary that extends around the circumference of the tire, the different kinds of base pitches in each row having the same circumferential lengths as corresponding kinds of base pitches in the other row and being arranged in the same pitch sequence, at least one kind of base pitch of each row having a laterally extending groove or sipe that intersects the circumferential boundary at the same location as a laterally extending groove or sipe in a laterally adjacent base pitch of the other row, whereby the tread has laterally extending grooves and/or sipes that extend continuously across the circumferential boundary between the rows of base pitches.

3. A tire that exhibits reduced tire noise when rolling on pavement comprising:

a tread having two circumferential shoulders and a plurality of grooves and/or sipes between said shoulders arranged in a pattern that is divided into at least three different kinds of base pitches, said base pitches being separated from one another by lateral boundaries extending parallel to the axis of rotation of the tire and arranged in at least one row extending around the circumference of the tire, at least one of the grooves and/or sipes within each of said base pitches being a circumferential groove or sipe that extends between the lateral boundaries of the base pitch and intersects the lateral boundaries at locations that are substantially the same distances from said circumferential shoulders, and the three different kinds of base pitches being distinguished from one another by the circumferential groove or sipe in each kind of base pitch that has a maximum lateral variation from its intersection with the lateral boundary of the base pitch that is different from the maximum lateral variations of the grooves or sipes of the other base pitches, but the circumferential grooves and/or sipes of all of said base pitches intersecting said lateral boundaries at locations that are substantially the same distances from said circumferential shoulders, whereby said base pitches are arrangeable in any pitch sequence and, regardless of the sequence, the circumferential groove or sipe in each base pitch connects with the circumferential grooves or sipes of the adjoining pitch sections to form a circumferential groove or sipe that extends continuously around the tire, with the circumferential groove or sipe within each different kind of base pitch having a distinctive geometrical shape that alters the distribution of noise frequencies produced when the tire rolls on the pavement.

4. The tire of claim 3, wherein the plurality of grooves and/or sipes of said tread are arranged in a pattern that is divided into at least two rows of base pitches extending around the circumference of the tire, the base pitches extending around the circumference of the tire, the base pitches of one row being separated from the base pitches of the other row by a circumferential boundary that extends around the circumference of the tire, the different kinds of base pitches in each row having the same circumferential lengths as corresponding kinds of base pitches in the other row and being arranged in the same pitch sequence, at least one kind of base pitch of each row having a laterally extending groove or sipe that intersects the circumferential boundary at the same location as a laterally extending groove or sipe in a laterally adjacent base pitch of the other row, whereby the tread has laterally extending grooves and/or sipes that extend continuously across the circumferential boundary between the rows of base pitches.

* * * * *